(12) United States Patent
Amadon et al.

(10) Patent No.: US 6,867,889 B1
(45) Date of Patent: Mar. 15, 2005

(54) TRANSCEIVER FOR A WIRELESS OPTICAL TELECOMMUNICATION SYSTEM

(75) Inventors: Charles Gregory Amadon, Seattle, WA (US); Richard D. Rallison, Paradise, UT (US); Mark Pratt, Seattle, WA (US); David P. Bajorins, Redmond, WA (US); Lawrence Cooper Stapleton, Seattle, WA (US); Richard B. Riday, Kirkland, WA (US); Harold Alexander Brown, Renton, WA (US); William Joseph Lauby, Mukilteo, WA (US); Michael Thomas, Belmont, MA (US); Scott William Sparrold, Bothell, WA (US)

(73) Assignee: Terabeam Corporation, Falls Church, VA (US)

( * ) Notice: Subject to any disclaimer, the term of this patent is extended or adjusted under 35 U.S.C. 154(b) by 0 days.

(21) Appl. No.: 10/686,881

(22) Filed: Oct. 16, 2003

Related U.S. Application Data

(60) Division of application No. 09/802,672, filed on Mar. 9, 2001, now Pat. No. 6,678,079, which is a continuation-in-part of application No. 09/627,815, filed on Jul. 28, 2000, now Pat. No. 6,608,708.

(51) Int. Cl.[7] .............................. G02B 5/32; H04B 10/10
(52) U.S. Cl. .............................. 359/16; 359/15; 359/19; 398/122; 398/118
(58) Field of Search ................................. 398/122, 129, 398/131, 118; 359/15, 16, 19

(56) References Cited

U.S. PATENT DOCUMENTS

| | | | |
|---|---|---|---|
| 3,492,484 A | 1/1970 | Iti | |
| 3,824,597 A | 7/1974 | Berg | |
| 4,329,409 A | 5/1982 | Wreede et al. | |
| 4,490,981 A | 1/1985 | Meckler | |
| 5,095,375 A | * 3/1992 | Bolt .............................. 359/1 |
| 5,101,460 A | 3/1992 | Richard | |
| 5,206,499 A | * 4/1993 | Mantravadi et al. ...... 250/203.6 |
| 5,255,065 A | 10/1993 | Schwemmer | |
| 5,440,669 A | * 8/1995 | Rakuljic et al. ................ 359/7 |
| 5,479,540 A | 12/1995 | Boudreau et al. | |
| 5,517,339 A | 5/1996 | Riccobono et al. | |
| 5,526,144 A | * 6/1996 | Dickson ....................... 359/15 |
| 5,594,580 A | * 1/1997 | Sakanaka et al. ........... 398/122 |
| 5,691,830 A | * 11/1997 | Dickson et al. ............... 359/15 |
| 5,710,652 A | * 1/1998 | Bloom et al. ............... 398/129 |
| 5,973,806 A | 10/1999 | Campbell et al. | |
| 6,347,001 B1 | * 2/2002 | Arnold et al. .............. 398/122 |
| 6,738,322 B2 | * 5/2004 | Amble et al. ............. 369/44.27 |

FOREIGN PATENT DOCUMENTS

| | | |
|---|---|---|
| GB | 2 123 974 A | 2/1984 |
| JP | 63-146627 | 6/1988 |
| JP | 06-059615 | 3/1994 |
| JP | 2000-314916 | 11/2000 |

* cited by examiner

*Primary Examiner*—John Juba, Jr.
(74) *Attorney, Agent, or Firm*—Blakely Sokoloff Taylor & Zafman LLP

(57) ABSTRACT

A holographic optical element (HOE) device is mounted in wireless optical telecommunication system transceiver. The HOE device includes a developed emulsion material having an interference pattern recorded thereon, sandwiched between a pair of elements, such as a pair of clear glass plates. In operation, the HOE device uses the recorded interference pattern to diffract received light rays towards an optical processing unit of the system receiver. A transmitter unit can be positioned at least in part behind the HOE device. An opening in the emulsion material allows a light signal transmitted from the transmitter unit to be substantially unaffected by the recorded interference pattern. The transceiver can also include a spotting scope and an alignment beacon.

6 Claims, 7 Drawing Sheets

TRANSCEIVER FOR A WIRELESS OPTICAL TELECOMMUNICATION SYSTEM

CROSS-REFERENCE TO RELATED APPLICATION

This application is a divisional under 37 C.F.R. § 1.53(b) of U.S. patent application Ser. No. 09/802,672, filed on Mar. 9, 2001, now U.S. Pat. No. 6,678,079, and claims priority therefrom under 35 U.S.C. § 120. The priority application is a continuation-in-part (CIP) of U.S. application Ser. No. 09/627,815, filed Jul. 28, 2000, now U.S. Pat. No. 6,608,708.

TECHNICAL FIELD

This disclosure relates generally to wireless optical telecommunication systems, and in particular but not exclusively, relates to a transceiver that is usable in a wireless optical telecommunication system.

BACKGROUND

At a basic level, a typical wireless optical telecommunication system comprises an optical transmitter and an optical receiver, with associated electronics to modulate and demodulate data on a light beam. Often, receivers are basically telescopes, while transmitters sometimes comprise units that are located separately from the receiver.

These optical transmitter and receiver units may have many parts, thereby contributing to the overall size or "footprint" of the units. The individual parts themselves may also have a large footprint. This increased footprint can be detrimental in situations where the units need to be installed in a non-obtrusive manner. The increased footprint can also disadvantageously limit the amount of available space, within the housing of the transmitter or receiver units, in which to fit the various parts or components.

These optical transmitter and receiver units can also be difficult to align properly during installation and during use. Furthermore, the various optics and components of typical optical transmitters and optical receivers are heavy, fragile, bulky, and difficult to manufacture with consistent quality, and are often expensive. Because optical communications systems are capable of much higher data rates than traditional radio frequency (RF) systems, the ability to make stable and inexpensive systems is becoming more and more desirable.

SUMMARY OF THE INVENTION

According to an aspect of the invention, an apparatus provides a holographic optical element (HOE) device that is disposed in a receiver unit. The HOE device includes an interference pattern recorded on an emulsion material. A transmitter unit is disposed at least in part behind the HOE device. The emulsion material is shaped to allow transmission of a light signal from the transmitter unit through the HOE device, substantially unaffected by the recorded interference pattern.

BRIEF DESCRIPTION OF THE DRAWINGS

Non-limiting and non-exhaustive embodiments of the present invention will be described in the following figures, wherein like reference numerals refer to like parts throughout the various views unless otherwise specified.

DETAILED DESCRIPTION OF THE ILLUSTRATED EMBODIMENTS

Embodiments of a transceiver that can be used in a wireless optical telecommunication system are described in detail herein. In the following description, numerous specific details are provided in order to provide a thorough understanding of embodiments of the invention. One skilled in the relevant art will recognize, however, that the invention can be practiced without one or more of the specific details, or with other methods, materials, components, etc. In other instances, well-known structures, materials, or operations are not shown or described in detail to avoid obscuring aspects of various embodiments of the invention. Furthermore, it is understood that the various embodiments shown in the figures are illustrative representations, and are not necessarily drawn to scale.

Reference throughout this specification to "one embodiment" or "an embodiment" means that a particular feature, structure, material, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, materials, or characteristics may be combined in any suitable manner in one or more embodiments.

Figure 1:
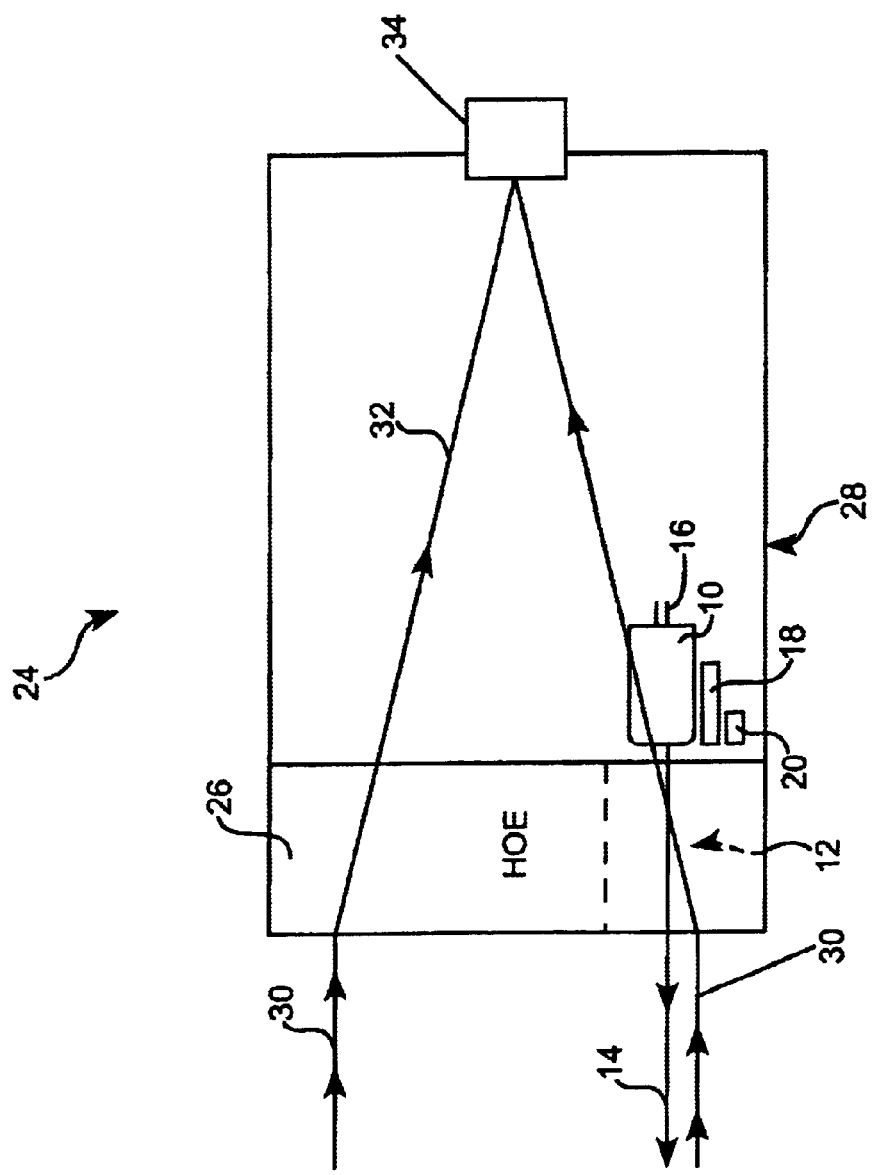
FIG. 1 is a functional block diagram showing a holographic optical element (HOE) device in a transceiver system according to an embodiment of the invention.

Referring first to FIG. 1, shown generally at 24 is an embodiment of a transceiver system having a HOE device 26 disposed in a cylindrical tube 28. The transceiver system 24 replaces traditional optical receiver elements with the HOE device 26. At a basic level, the HOE device 26 performs most or all of the light collection operations for incident light rays 30, and focuses resulting light rays 32 onto a detection unit 34. The light collection feature of the HOE device 26 can be useful in situations when the incident light rays 30 are dispersed and need to be efficiently collected. In an embodiment, the receiver portion of the transceiver system 24 has an instantaneous field-of-view of 800 $\mu$rads or more.

In operation, the incident light rays 30 can comprise all or part of a light signal sent from an optical transmitter system (not shown), having data modulated thereon, at a 1.25 Gbps data rate, for instance. According to an embodiment, the incident light rays 30 can comprise laser light and the like, having a wavelength of 1548.51 nm, for example. The incident light rays 30 are not limited to being monochromatic or to any particular wavelength or color, and may include visible light as well as ultraviolet or infrared portions of the spectrum.

The detection unit 34 can form part of an optical processing unit that includes photodetectors (such as avalanche photodiodes, phototransistors, PIN detectors, InGaAs photodetectors, charge coupled devices, or other such detectors or photosensitive devices, for example), processors, modulators/demodulators, and other electronic logic and electronic circuitry to extract and process the data from the resulting light rays 32. Such photodetectors can have a dynamic range of 70–90 dB in one embodiment, as an example. According to the embodiment shown in FIG. 1, the HOE device 26 can focus the resulting light rays 32 to a spot (having a size of approximately 70 microns in diameter or less than 100 microns in diameter, for example) at the detection unit 34.

According to an embodiment of the invention, the HOE device 26 comprises a hologram, which is made by recording interference fringe fields (e.g., an interference pattern) from two light signals (such as lasers), in a photoresist material (e.g., an emulsion material), and then developing the photoresist material. Embodiments of methods to manufacture HOE devices having recorded interference patterns are disclosed in "APPARATUS AND METHOD FOR CORRECTING ABERRATIONS IN PHOTON COLLECTION DEVICES," U.S. application Ser. No. 09/627,816, filed Jul. 28, 2000, currently pending, assigned to the same assignee as the present application, and incorporated by reference. This copending patent application further discloses an apparatus/method of correcting aberrations with the use of aspheric components.

The transceiver system 24 includes a transmitter unit 10 (such as a refractive optical transmitter) disposed within the cylindrical tube 28. In accordance with an embodiment of the invention, at least part of the transmitter unit 10 is located behind the HOE device 26. As will be described later and shown in greater detail in FIG. 3, the emulsion material of the HOE device 26 is removed from a region 12 to provide an opening through which a transmit light signal 14 passes. Removal of the emulsion material from the region 12 prevents the optical characteristics of the hologram from affecting the transmit light signal 14. By mounting the transmitter unit 10 behind the HOE device 26, the overall size of the transceiver system 24 can be reduced without significantly impacting overall performance.

As with the incident light rays 30, the transmit light signal 14 can comprise laser light having data modulated thereon. In one embodiment, the transmit light signal 14 can have a wavelength of 1625 nm and a transmit divergence of 0.8 mrads. The transmit light signal 14 can be provided to the transmitter unit 10, via optical fiber 16, from a light source (not shown). The transmitter unit 10 will be described in greater detail below with reference to FIG. 4.

According to an embodiment of the invention, a spotting scope 18 can also be located behind the HOE device 26 and within the cylindrical tube 28. The spotting scope 18 can be used during installation to initially point the transceiver system 24 towards the source (not shown) of the incident light rays 30 and/or towards the target of the transmit light signal 14. Alternatively or in addition, the spotting scope 18 can be used to help align the transceiver system 24, if necessary, after installation.

According to an embodiment of the invention, the spotting scope 18 is located near the transmitter unit 10. This allows the spotting scope 18 to use the region 12 or other region where the emulsion material of the HOE device 26 has been removed, thereby giving the spotting scope 18 a substantially unobstructed field-of-view. That is, placement of the spotting scope 18 in this location allows the image obtained by the spotting scope 18 to be substantially unaffected by the optical characteristics of the hologram, since the emulsion material has been removed from the region 12. By also mounting the spotting scope behind the HOE device 26, the overall size of the transceiver system 24 can be reduced without significantly affecting overall performance.

In an embodiment of the invention, the spotting scope 18 includes an image sensor device and "cross-hairs." The cross-hairs are used to pinpoint the transceiver system 24 to the target of the transmit light signal 14 and/or to the source of the incident light rays 14. The transceiver system 24 can be moved as the cross-hairs are moved, thereby providing alignment adjustment. The image sensor device of the spotting scope 18 can comprise a complementary metal oxide semiconductor (CMOS) image sensor chip that captures images (or frames) of what the cross-hairs are pointing to. For instance, the cross-hairs can be moved to pinpoint towards an alignment beacon of an opposing transceiver located several hundred yards away. The image sensor can capture the image of that alignment beacon, which can then be viewed in relation to the cross-hairs to determine the degree of alignment adjustment that is needed. The image capture, its comparison to the cross-hairs, and subsequent positional change of the transceiver system 24 can be performed, singly or in combination, by a computer in one embodiment. In another embodiment, some of these operations can be performed manually.

The transceiver system 24 itself, in an embodiment, can have its own alignment beacon 20. This allows opposing transceivers to align to the transceiver system 24 via use of their own spotting scopes. Such alignment can be performed during initial installation and/or afterwards.

In an embodiment, the alignment beacon 20 can be positioned near the spotting scope 18, behind the region 12 of the HOE device, for instance. This allows the alignment beacon 20 to be visible, with minimal obstruction, to the opposing spotting scopes, even when the transceiver system 24 is located behind mirrored windows or at night. In other embodiments, the alignment beacon 20 can be located at other locations of the transceiver system 24, such as mounted on the outer edge of the cylindrical tube 28.

The alignment beacon 20 outputs a visible or infrared (IR) light according to one embodiment. The alignment beacon 20 can also be provided via the same optical fiber or optical component(s) as the transmit light signal 14. In such an embodiment, the light from the alignment beacon 20 can be transmitted concurrently with the transmit light signal 14 on the same optical fiber, but has a different wavelength, intensity, modulation, or other characteristic that distinguishes it from the transmit light signal 14.

Figure 2:
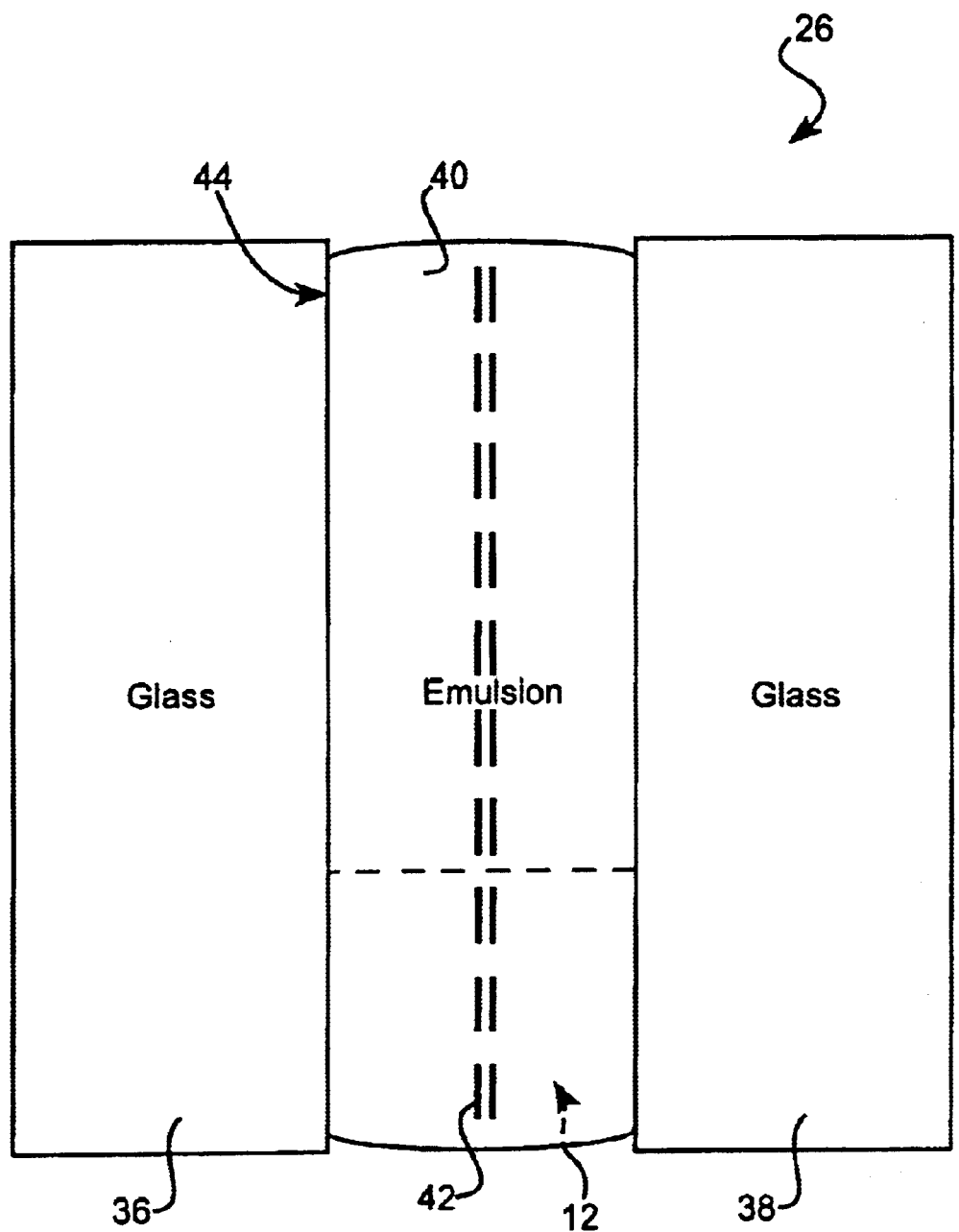
FIG. 2 is a side view of an embodiment of a HOE device that can be used in the transceiver system of FIG. 1.

As shown in greater detail in FIG. 2, the HOE device 26 in one embodiment comprises a first element 36 and a second element 38, with both elements sandwiching a developed emulsion material 40 having an interference pattern 42 recorded thereon. During a recording process, such as that described in the copending U.S. application Ser. No. 09/627,816 identified above, the emulsion material 40 is first deposited over a surface 44 of the first element 36, and then exposed to interfering light signals to obtain the interference pattern 42. The region 12 may be cut out prior to or after the recording process. Subsequently, the second element 38 is affixed or mated over the developed emulsion material 40, to provide a seal to protect the emulsion material 40 from environmental contaminants, such as moisture. Thereafter, an anti-reflective coating may be applied to one or more of the exposed surfaces of the HOE device 26. Application of the anti-reflective coating(s) may also be done before affixing the second element 38 over the developed emulsion material 40.

According to one embodiment, the first element 36 and the second element 38 comprise plates of glass having flat surfaces, although other types of materials, such as molded plastic, may be used in other embodiments. The first element 36 and the second element 38 can have a diameter of 16 inches and a thickness of 0.236 inches, for example. A person skilled in the art will recognize that these dimensions may vary or may be scaled based on various criteria and optical factors, such as type of material used, type of application, coefficient of thermal expansion, index of refraction, dispersion, etc. An illustrative HOE device 26 used for the transceiver system 24 may use standard BK-7 glass for the first element 36 and for the second element 38, with the BK-7 glass having known physical and optical properties. The materials used for the first element 36 and for the second element 38 can have an index of refraction of approximately 1.5, for example. Consequently, the invention is not necessarily limited by specific physical dimensions or by specific physical or optical properties of the first element 36 and second element 38.

According to an embodiment, the HOE device 26 may utilize a dichromated gelatin for the emulsion material 40, though photopolymers that provide a high level of diffraction efficiency for the intended purposes, or can otherwise perform adequately for specific wavelengths, may also be used. A suitable type of gelatin, which can be mixed with dichromate according to ratios known by those skilled in the art, is designed by Ralcon Development Lab, located at Paradise City, Utah, and manufactured by Kind & Knox Gelantine, Inc., located at Sioux City, Iowa, under their Gelita™ line of optical gelatins, Type 7644, Lot 2. In another embodiment, the emulsion material 40 may be made from a homogenized mixture of gelatin and silver halides, such as those mixtures that are commercially available for optical applications.

Surfaces of the first element 36 and second element 38 are typically made as smooth as possible, to avoid introduction of unacceptable aberrations during a playback process. Additionally, the material making up the first element 36 and second element 38 should be transparent, so as to reduce scattering effects and/or to improve the incident light rays' 30 transmission efficiency.

An embodiment of the HOE device 26 uses a recorded volume phase hologram (e.g., the interference pattern 42) that causes light rays passing through the HOE device 26, during the playback process (e.g., during reception of incident light rays 30), to substantially focus at a location facing the exposed surface of the second element 38 (e.g., to focus at a spot on the detection unit 34). Stated in another way, during the playback when the incident light rays 30 (at a wavelength of 1548.51 nm in one embodiment) are received at the HOE device 26, the incident light rays 30 pass through the first element 36 to the interference pattern 42. The interference pattern 42 diffracts the incident light rays 30 into the second element 38 and on towards the detection unit 34.

The index of refraction in the volume phase hologram varies sinusoidally over the aperture in one embodiment. The sinusoidal frequency increases with increasing aperture. The sinusoidal pattern is obtained by construction optics during the recording process, and establishes the focal length f of the HOE device 26, where the focal length f is the distance along an optical axis of the HOE device 26 for an on-axis transceiver system, measured from approximately the interference pattern 42 to the spot on the detection unit 34 where the resulting light rays 32 focus. The focal length f of the HOE device 26 may be, in general terms, determined by the following equation:

$$f = \left[ q \frac{\lambda_c}{\lambda_0} \left( \frac{1}{R_0} - \frac{1}{R_r} \right) \right]$$

q=diffracted order
$\lambda_c$=playback wavelength
$\lambda_0$=construction wavelength
$R_0$=distance from from HOE to first construction point
$R_r$=distance from from HOE to second construction point
Further explanation and illustration with regards to the specific variables involved in this equation can be found in the parent (U.S. application Ser. No. 09/627,815) of the present CIP application.

Figure 3:
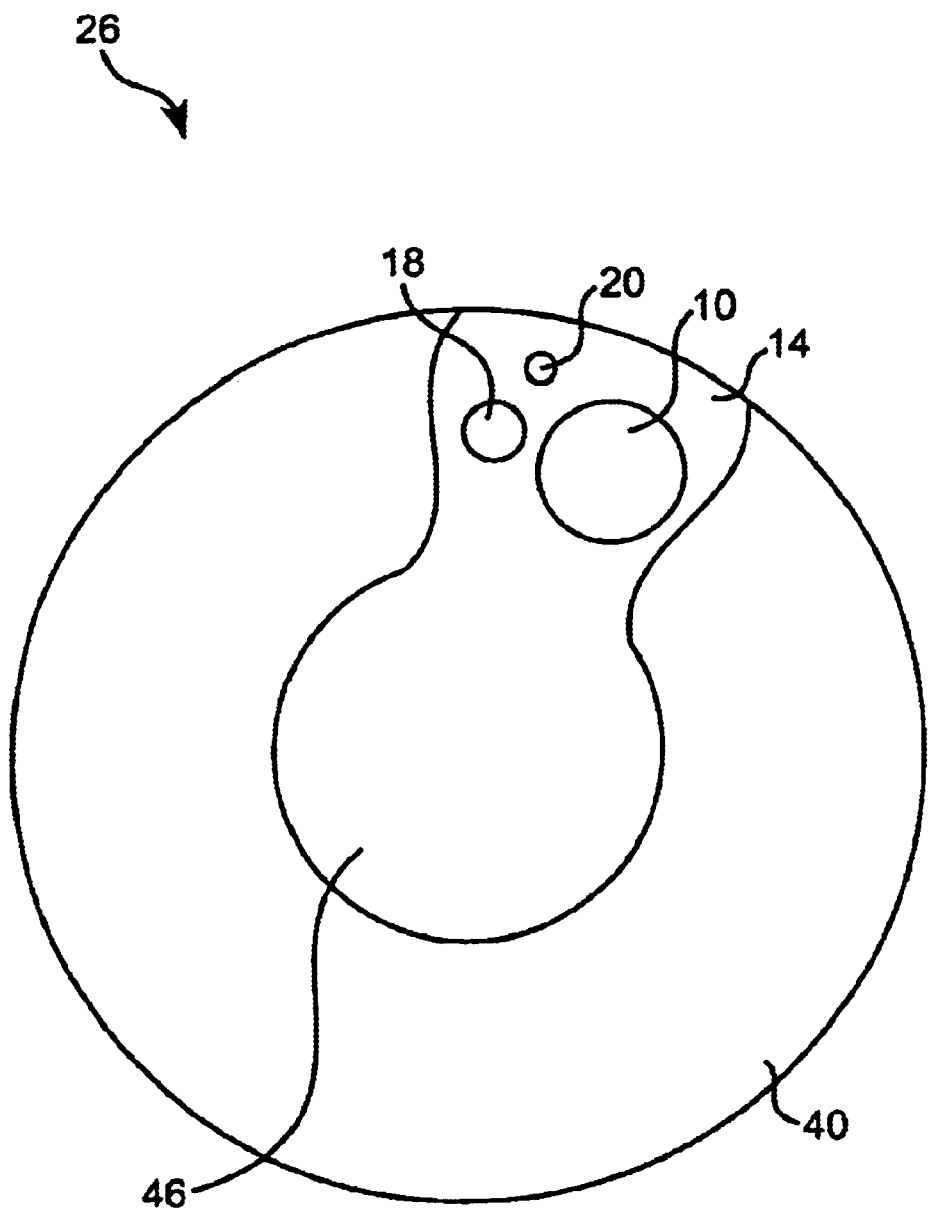
FIG. 3 is a front view of the HOE device of FIG. 2.

FIG. 3 is a front view of the HOE device 26, showing the various regions. In an embodiment, the emulsion material 40 has a substantially annular shape, but has the region 14 removed to accommodate the transmitter unit 10, the spotting scope 18, and possibly the alignment beacon 20. By being shaped to have the region 14 devoid of emulsion material, the HOE device 26 provides minimal or no obstruction at the region 14. Alternatively or in addition, a region devoid of the emulsion material 40 and which is separate from the region 14 can be provided for the spotting scope 18 and/or the alignment beacon 20.

Figure 5:
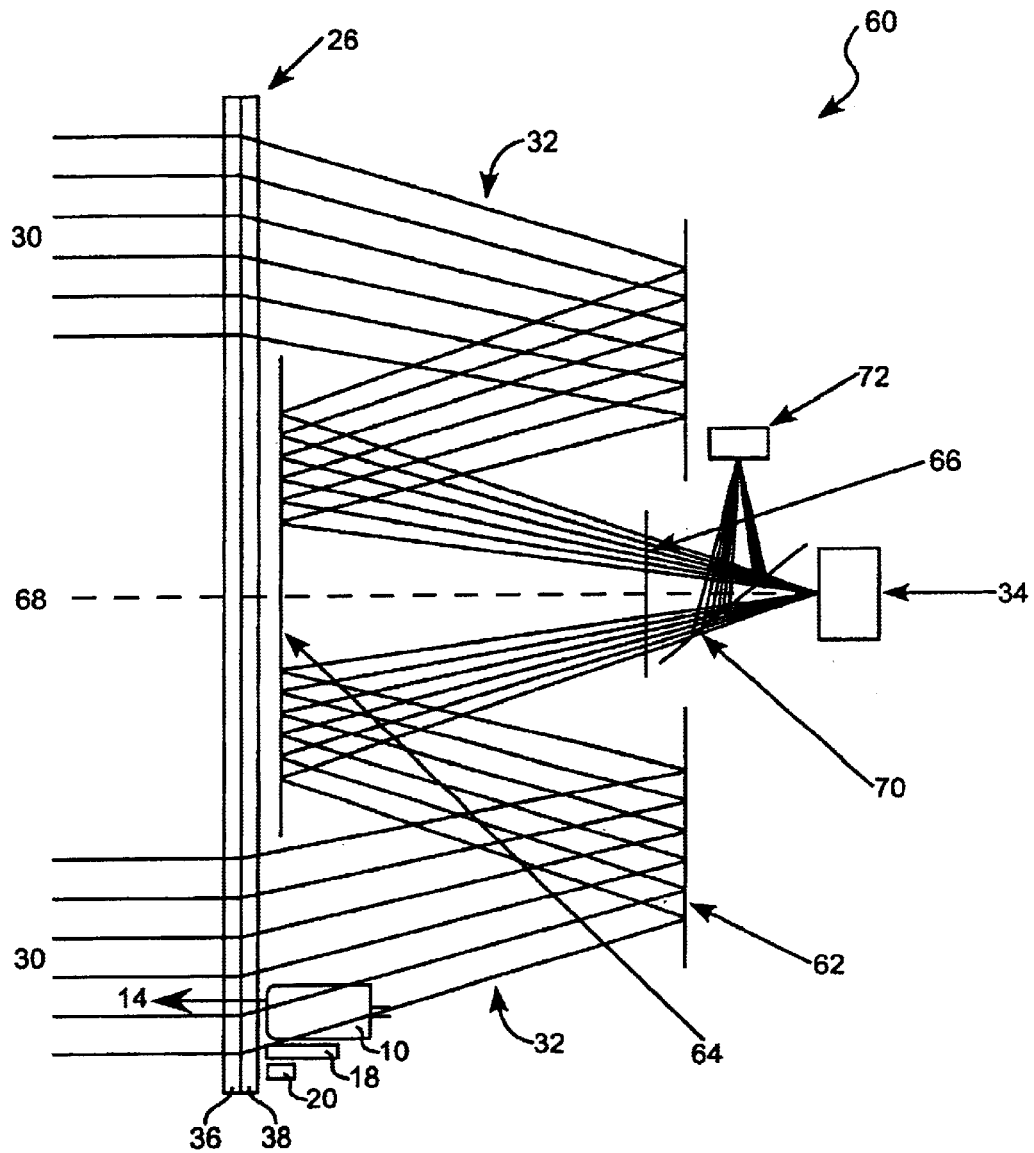
FIG. 5 is a functional block diagram showing the HOE device of FIGS. 2–3 and the transmitter unit of FIG. 4 in a transceiver system according to another embodiment of the invention.
Figure 6:
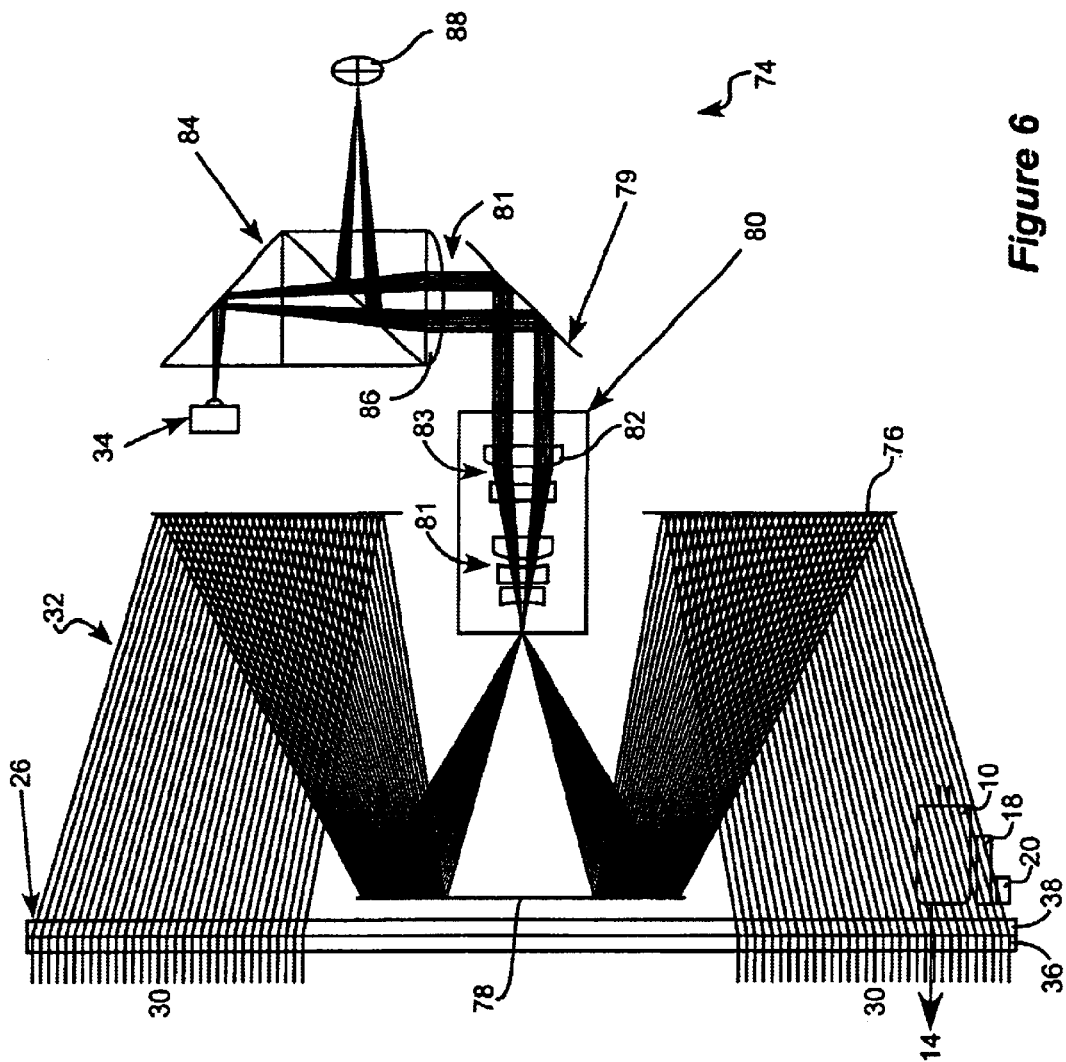
FIG. 6 is a functional block diagram showing the HOE device of FIGS. 2–3 and the transmitter unit of FIG. 4 in a transceiver system according to another embodiment of the invention.

A center obscuration 46 can also be devoid of the emulsion material 40 according to an embodiment. The obscuration 46 can have a diameter of 11 cm, for instance, such that the HOE device 26 can collect the incident light rays 30 into a cone. The embodiments of transceiver systems in FIGS. 5 and 6 illustrate this conical collection of light, and also illustrate that flat mirrors 64 or 78 may be positioned behind the obscuration 46. In another embodiment, there is no obscuration 46 (e.g., the emulsion material 40 occupies the center region).

As is evident in FIG. 3, the transmitter unit 10, the spotting scope 18, and the alignment beacon 20 are located towards the edge of the HOE device 26. This embodiment allows the incident light rays 30 to be exposed to the maximum amount of emulsion material 40. Stated in another way, the hologram of the interference pattern 42 can collect a maximum amount of light, while obstruction of the transmit light rays 14 from the transmitter unit 10 can be minimized.

Figure 4:
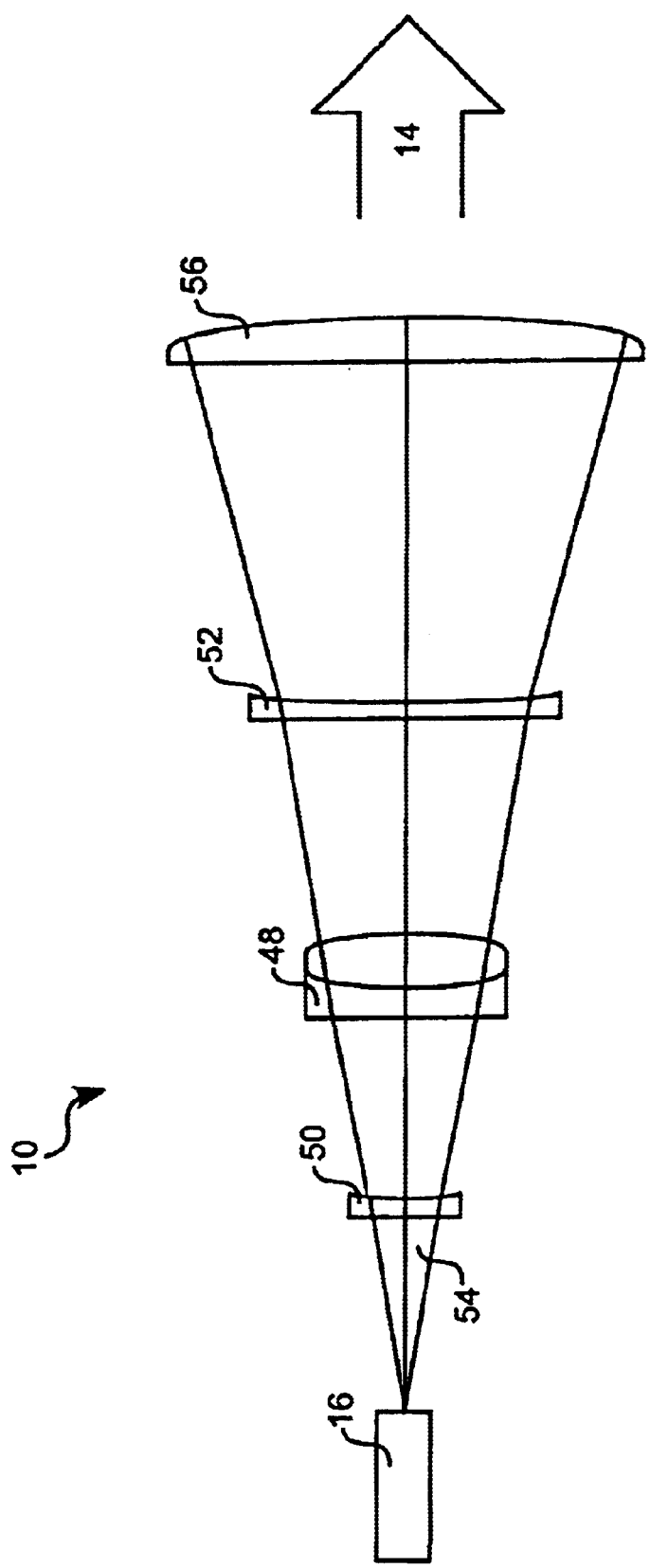
FIG. 4 is a schematic block diagram of a transmitter unit for the transceiver system of FIG. 1.

FIG. 4 illustrates the transmitter unit 10 in greater detail. In operation, light 54 exits from the optical fiber 16 and is expanded by optical elements 48 and 50. The optical elements 48 and 50 can comprise glass material (such as BK-7 glass). In an embodiment, the element 48 comprises a doublet that can be used for aberration correction. A low power, in one embodiment, optical element 52 can be movable, via motor control or manually, to control divergence and/or to control range. Another optical element, such as a lens 56, is positioned at the end of the transmitter unit 10 and faces the region 12 of the HOE device 26 to output the transmit light signal 14. The lens 56 collimates the transmitted light signal 14 in one embodiment.

Embodiments of the invention may be implemented using various configurations. For example, FIG. 5 shows an embodiment of a "direct-to-focus" configuration, and FIG. 6 shows an embodiment of a "collimated" configuration. The collimated configuration has advantages in that it allows for the easy insertion of beam splitters for purposes of tracking, quality control, etc. Possible positions of the transmitter unit 10, the spotting scope 18, and the alignment beacon 20 are also shown in FIGS. 5 and 6.

Referring first to FIG. 5, shown generally at 60 is an embodiment of a transceiver system having a direct-to-focus configuration. The transceiver system 60 includes the HOE device 26 located at the front-end of the transceiver system 60, such that the first element 36 faces the incident light rays 30 and resulting light rays 32 are passed from the second element 38. The transceiver system 60 can also include a plurality of flat mirrors 62 and 64, and a steering mirror 66, to control the direction of the resulting light rays 32, and can further include various detector electronics to process the resulting light rays 32. All of the optical power (e.g., focusing ability) comes from the HOE device 26.

The flat mirrors 62 and 64 are used to decrease packaging size by folding the resulting light rays 32 on themselves. That is, the resulting light rays 32 are first reflected from the flat mirror(s) 62, towards the flat mirror(s) 64. The flat mirror(s) 64 then reflects the resulting light rays 32 towards the steering mirror 66. In this manner, an overall focal length of the transceiver system 60 is reduced.

The steering mirror 66 is used to keep the image focused (e.g., focuses the resulting light rays 32) on the detection unit 34. In this manner, the steering mirror 66 is used to compensate for high frequency movement caused by building sway or vibration upon the transceiver system 60. The steering mirror 66 may be oriented at a 45° angle relative to the incident light rays 30 or relative to an optical axis 68 of the HOE device 26. Consequently, the detection unit 34 may be positioned 90° relative to the optical axis 68. For the sake of clarity, this positioning/angle is not shown in FIG. 5.

A beam splitter 70 positioned behind the steering mirror 66 may be used to pick off a portion of the input beam (e.g., a portion of the resulting light rays 32) and direct it onto a quadrant cell optical detector 72 or other position sensing device(s). A resulting spot on the quadrant cell optical detector 72 is indicative of the input beam's relative input angle. This input angle may then be used to keep the transceiver system 60 "tracking" to the transmitter system (not shown) that transmits the incident light rays 30 at various ranges by adjusting the angle of the steering mirror 66.

The detection unit 34 can include an avalanche photo diode having a high gain and increased sensitivity. This is a type of detector that is typically used for communications, though any suitable optical signal detector can be used as well. For example, a PIN detector may be used.

An embodiment of a transceiver system 74 having a collimated configuration is shown in FIG. 6. Similar to the direct-to-focus configuration shown in FIG. 5, the collimated configuration of the transceiver system 74 of FIG. 6 also uses the HOE device 26 at the front end, a plurality of flat mirrors 76 and 78 to fold the resulting light rays 32 on themselves, and a steering mirror 79 to control the direction of the resulting light rays 32. Again, the steering mirror 79 and/or detection unit 34 may be oriented at different angles/positions relative to the optical axis. The transceiver system 74 includes other components for ease of implementation of various features for communications.

For example, a collimating optical assembly 80 receives the reflected resulting light rays 32 from the flat mirror 78 and re-collimates them into collimated light rays 81. In one embodiment, the collimating optical assembly 80 comprises a first series of lenses 81 that perform aberration correction and/or focusing. A second series of lenses 83 perform a collimating of the resulting light rays 32, so that the resulting light rays 32 are no longer converging or diverging. The HOE device 26 and collimating optical assembly 80 act as an afocal telescope, where light rays are collimated in and collimated out. This configuration is somewhat similar to that of binoculars and astronomical telescopes, where the HOE device 26 functions as an objective and the collimating optical assembly 80 functions as an eyepiece.

A last element 82, such as a lens, in the collimating optical assembly 80 may be moved longitudinally to refocus the transceiver system 74 for different link ranges from a transmitter system (not shown), or based on the convergence or divergence. In this manner, the transceiver system 74 can be adjusted to optimize reception of light from a transmitter system (not shown) located at specific distances. The movement of the element 82 may be accomplished via motor control or manually. The collimated path of the collimated light rays 81 gives the transceiver system 74 several distinct characteristics, including:

1. Reduction of tolerances for optics downstream of the HOE device 26.
2. Reduction of costs for the system transceiver 74.
3. Use of beam splitters (not shown) along the collimated path allows for multiple channels.
4. Plate beam splitters used in divergent light introduce astigmatism and therefore increases spot size, while a beam splitter in a collimated path induces no astigmatism The transceiver system 74 may include a beam splitting optical assembly 84. The beam splitting optical assembly 84 can comprise a module that has one or more components that are used to split, from the collimated light rays 81, the communication channel from the tracking channel, while using a common focusing lens 86. The light rays of the communication channel may then be focused or directed to the detection unit 34, while the light rays of the tracking channel are directed to a quadrant cell detector 88. In an embodiment, 10% of the collimated light rays 81 is directed to the tracking channel. According to one embodiment, the beam splitting optical assembly 84 can comprise a module including the lens 86, a beam splitter, and a mirror.

Figure 7:
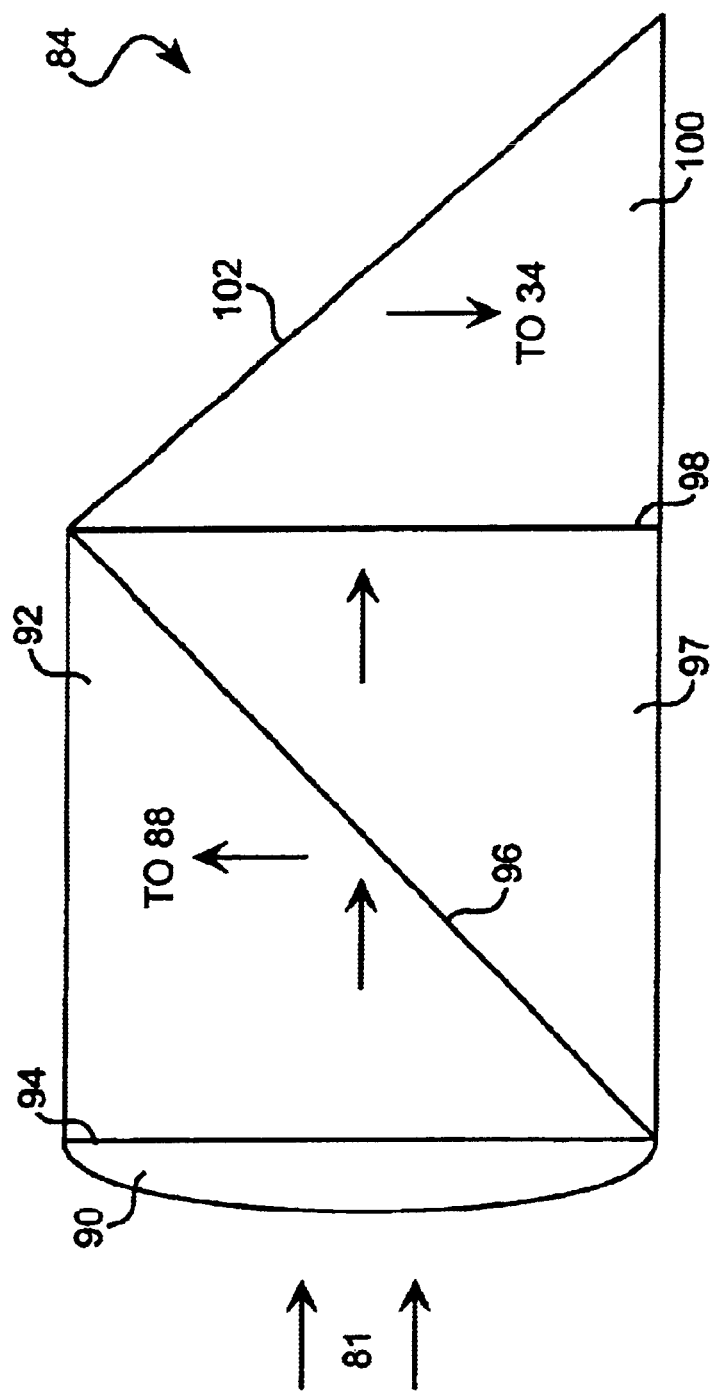
FIG. 7 shows an embodiment of a beam splitting optical assembly that can be used in the transceiver system of FIG. 6.

An embodiment of the beam splitting optical assembly 84 having these components is shown in greater detail in FIG. 7. A lens 90 (made of BK-7 glass, for example) faces the collimated light rays and refracts them into a first element 92 (made of BK-7 glass, for example). A transparent glue or other adhesive that is invisible to the refracted light rays may be applied at an interface 94 to hold the lens 90 and first element 92 together.

The first element 92 is connected to a second element 97 (made of BK-7 glass, for example) at an interface 96. The interface 96 may be at a 45° angle or other suitable angle, such that a portion of the refracted light rays is split at the interface 96 and directed towards the quadrant cell detector 88. In an embodiment, a dielectric film may be present at the interface 96. The dielectric film reflects a portion of the refracted light rays towards the quadrant cell detector 88, while allowing the remainder of the refracted light rays to pass through to the second element 97.

In one embodiment, a transparent glue can be used in addition to the dielectric film to connect the first element 92 to the second element 97 at the interface 96. In another embodiment, prisms may be used alternatively to glass elements glued together.

The portion of the refracted light rays that is passed into the second element 97 crosses an interface 98, which may have transparent glue that connects the second element 97 to a third element 100 (made of BK-7 glass, for example), and then passes into the third element 100. A reflective material, such as metal, may be deposited on or affixed to a surface 102 of the third element 100. This reflective material acts as a mirror (or makes the surface 102 a reflective surface) that directs the portion of the refracted light rays toward the detection unit 34.

The embodiment of the beam splitting optical assembly 84 shown in FIG. 7 has the advantage of being monolithic. That is, it is smaller in size and footprint, more rugged, and easier to align because it is made into a single piece. Furthermore, an embodiment of the beam splitting optical assembly 84 includes components that are index-matched, thereby minimizing undesirable scattering or reflection.

In summary, the HOE device 26, having a volume phase hologram or interference pattern 42 recorded thereon, may be used in a transceiver system to receive incident light rays 30 and to substantially focus resulting light rays 32 in a direction towards a location facing the HOE device 26. Such a location may be a spot at the detection unit 34, although various mirrors, beam splitters, collimating optical assemblies, beam splitting optical assemblies, and the like, may be used to control and manipulate the resulting light rays before they reach the detection unit 34. The HOE device 26 can comprise the emulsion material 40 that is sandwiched between the first element 36 and the second element 38, with the emulsion material 40 being developed and processed to include the interference pattern 42, such as a volume phase hologram. In an embodiment, a region 12 of the emulsion material 40 is removed to allow the transmitter unit 10, the spotting scope 18, and the alignment beacon 20 to be positioned behind the HOE device 26 with minimal obstruction, while adding to the compactness of the transceiver system 24.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. For example, while some embodiments of the transceiver system have been described as using mirrors and/or beam splitters having specific orientations, it is understood that other embodiments may not include these components or that other embodiments may have other configurations or orientations.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A system, comprising:
   a holographic optical element (HOE) device having:
      a first element having first and second surfaces, the first surface being positionable to face incident light rays,
      an emulsion material disposed over the second surface of the first element and having a recorded interference pattern thereon, and
      a second element having a first surface disposed over the emulsion material, the second element being structured to pass resulting light rays, derived from the incident light rays diffracted by the recorded interference pattern, in a direction towards a location facing a second surface of the second element;
   an optical processing unit to receive the resulting light rays passed by the second element;
   a collimating optical assembly positionable between the HOE device and the optical processing unit to collimate the resulting light rays; and
   an optical element positionable between the collimating optical assembly and the optical processing unit to separate, from the collimated resulting light rays, a tracking channel and a communication channel, and to direct the communication channel towards the optical processing unit.

2. The system of claim 1 wherein the collimating optical assembly includes a movable refocusing element to longitudinally refocus the collimated resulting light rays.

3. The system of claim 2 wherein the refocusing element is movable via motor control.

4. The system of claim 1 wherein the collimating optical assembly includes a plurality of lenses to correct aberrations in the resulting light rays.

5. The system of claim 1 wherein the optical element comprises a monolithic optical element, the monolithic optical element including:
   a lens to refract the resulting light rays;
   a first element, coupled to the lens and coupled to a second element at an interface, to receive the refracted light rays from the lens;
   a beam splitter disposed at the interface between the first and second element to direct the refracted light rays to the tracking channel and to the communication channel; and
   a third element coupled to the second element, the third element having a reflective surface to reflect the refracted light rays of the communication channel towards the optical processing unit.

6. An apparatus, comprising:
   a holographic optical element (HOE) device disposed in a receiver unit, the HOE device including a recorded interference pattern, the HOE device being positionable to face incident light rays and being capable of passing the incident light rays as resulting light rays diffracted by the recorded interference pattern;
   a collimating optical assembly positionable between the HOE device and an optical processing unit to collimate the resulting light rays; and
   a monolithic optical element positionable between the collimating optical assembly and the optical processing unit to separate, from the collimated resulting light rays, a tracking channel and a communication channel, and to direct the communication channel towards an optical processing unit, the monolithic optical element including:
      a lens to refract the resulting light rays;
      a first element, coupled to the lens and coupled to a second element at an interface, to receive the refracted light rays from the lens;
      a beam splitter disposed at the interface between the first and second element to direct the refracted light rays to the tracking channel and to the communication channel; and
      a third element coupled to the second element, the third element having a reflective surface to reflect the refracted light rays of the communication channel towards an optical processing unit.

* * * * *